Figure 1:
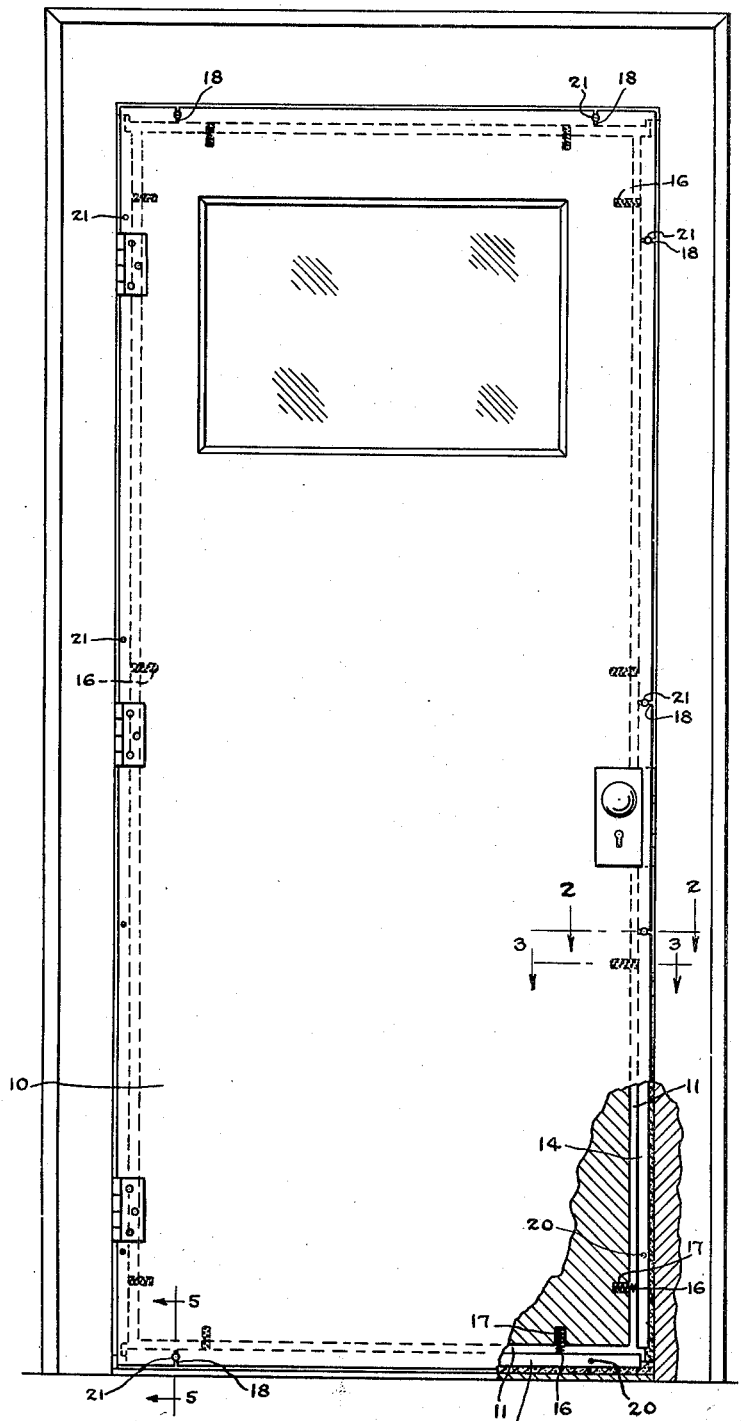

Sept. 11, 1934.　　　　F. E. HUFNAIL ET AL　　　　1,973,210
AUTOMATIC COMPENSATING DEVICE FOR SEALING OPENINGS
AROUND DOORS, WINDOWS, AND THE LIKE
Filed Aug. 13, 1932　　　2 Sheets-Sheet 1

Inventors
Francis E. Hufnail.
Albert C. Hufnail.
By Whiteley and Ruckman
Attorneys.

Sept. 11, 1934.  F. E. HUFNAIL ET AL  1,973,210
AUTOMATIC COMPENSATING DEVICE FOR SEALING OPENINGS
AROUND DOORS, WINDOWS, AND THE LIKE
Filed Aug. 13, 1932   2 Sheets-Sheet 2
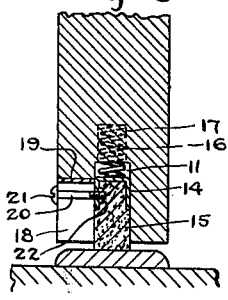
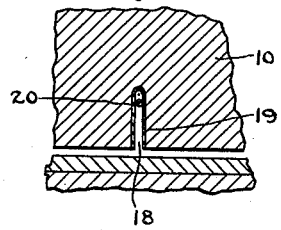
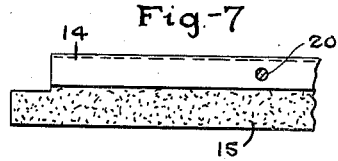
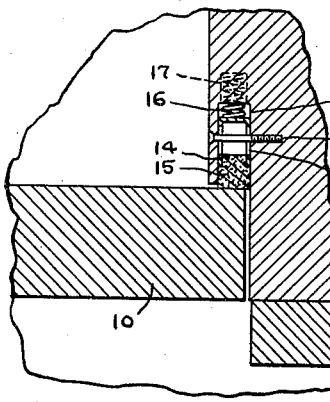
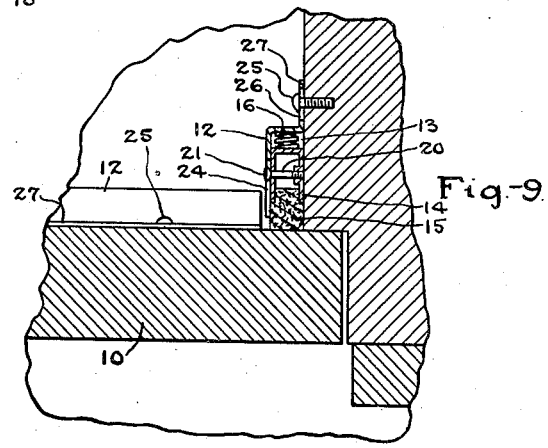
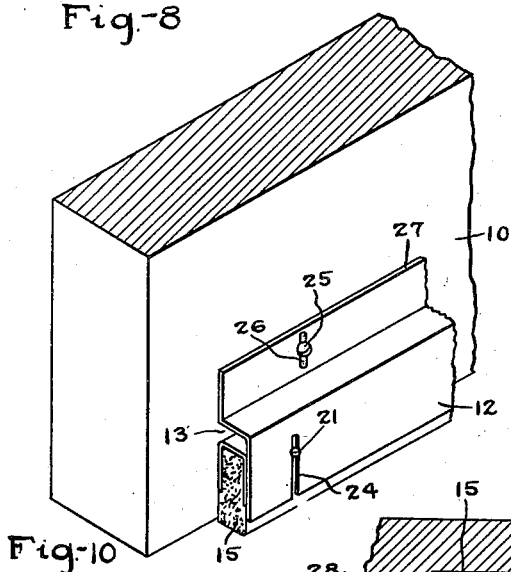
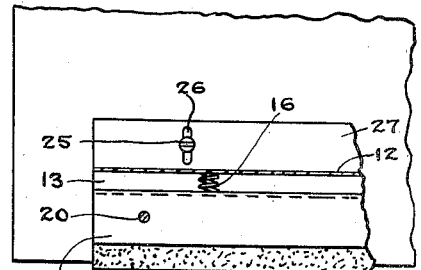
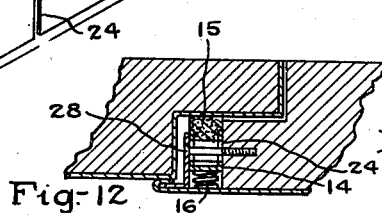
Inventors:
Francis E. Hufnail.
Albert C. Hufnail.
By Whiteley and Ruckman
Attorneys.

Patented Sept. 11, 1934

1,973,210

UNITED STATES PATENT OFFICE 1,973,210

AUTOMATIC COMPENSATING DEVICE FOR SEALING OPENINGS AROUND DOORS, WINDOWS, AND THE LIKE

Francis E. Hufnail and Albert C. Hufnail, Grandview, Wash.

Application August 13, 1932, Serial No. 628,626

5 Claims. (Cl. 20—68)

Our invention relates to automatic compensating devices for sealing openings around doors, windows and the like. In the construction of buildings and vehicles, such as closed cars, essential openings into the rooms formed thereby, those for doors and windows, are customarily closed by swinging or sliding doors or windows, or both.

Although cabinet or sheet metal work aims to produce a reasonable degree of tightness of closure when the door or window is in closing position, it is mechanically impossible to produce a degree of tightness which will exclude ingress of air drafts and dust, dirt and germs accompanying them. Various forms of so-called weather stripping have been employed in an effort to remedy this defect. A difficulty met with in connection with such weather stripping is that when through wear or imperfect fitting certain parts of the weather stripping are reduced or deformed, holes will result which such weather stripping is powerless to close, and there are no means in connection therewith for permitting suitable adjustment of the weather stripping to effect the desired result. It is an object of our invention to overcome these defects in weather stripping by providing automatically compensating stop members secured to and movable with the door or secured to frame members about doors or window openings whereby the opening will be automatically closed upon closing of door or window, and whereby, further, when the stop member becomes worn or deformed so as to permit cracks to open through, it can be made to automatically adjust itself to compensate for such cracks and be readily reset in fixed position for that purpose.

With swinging members, through doors or windows, it is only necessary to have complete contact between the sealing members and the jams and sills to block the flow of air. If members are employed which project too far undue wear and deformation inevitably results, and this produces unevenness in the sealing member with resulting openings through, which defeats the purpose of the sealing member. It is important, therefore, that the projection of the sealing member be such as to make firm contact but not such as to produce undue projection. Moreover, continued operation of such a door, particularly if there is undue projection, will produce unequal wear of the sealing member. It is important, therefore, and is a principal object of our invention, to provide means in connection with the sealing member such as to permit, from time to time when desired, compensating adjustment to take care of these inequalities and to insure continuous uniform contact.

The means which we have provided for accomplishing these new and highly desirable results consist of the provision of a sealing member housed in a guide or slot formed in the body of an edge of the door or window or formed by an attachment upon the same with means for causing said member to be projected outwardly to engage firmly the surface with which it is to make sealing contact, and other means adapted to be released and set at will for fixing the member in such contacting position until its wear shall require further compensating adjustment.

The full objects and advantages of our invention will appear in connection with the detailed description thereof and the novel features of our inventive idea will be particularly pointed out in the claims.

In the drawings, illustrating the application of our invention in one form—

Figure 2:
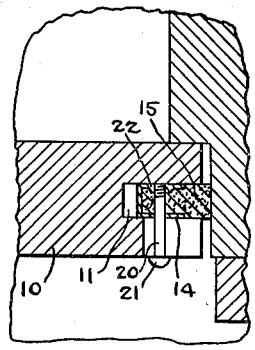
Figure 4:
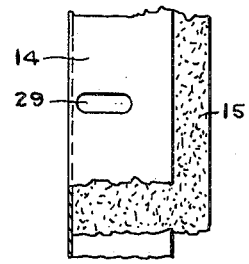
Figure 3:
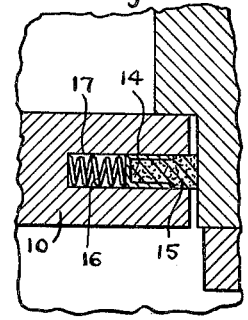

Fig. 1 is a plan view of an ordinary door having our stop members applied thereto. Fig. 2 is a section taken on line 2—2 of Fig. 1. Fig. 3 is a section taken on line 3—3 of Fig. 1. Fig. 4 is an enlarged view of a portion of one of the stop members. Figs. 5 and 6 are transverse sectional views showing how the stop member is mounted for automatic accommodation and self adjustment. Fig. 7 is a side view of a stop member such as shown in Fig. 5. Figs. 8 and 9 show forms of stop members attached in different ways to a part of the frame and adapted to be engaged by a portion of a door upon closing thereof. Figs. 10 and 11 are views showing a means of attachment of stop members exterior to the body of a closure member such as a door or window. Fig. 12 is a fragmentary sectional view showing the application of our invention to an automobile door.

As illustrated in Fig. 1, a door 10 is mounted in the usual way to close a door opening. Within the body of the door and about the edges thereof is formed a groove 11 of sufficient depth, or, as shown in Figs. 10 and 11, an attachment piece 12 may be applied to a face of the door adjacent its edges to form a groove 13 similar to the groove 11. Within the groove 11 is mounted a metallic slide 14 which carries a strip 15 of sealing material adapted to be projected beyond the edge limits ahead of the slide 14 by means of a considerable number of coiled springs 16 or other satisfactory spring member, the springs preferably being seated in holes 17 within the body of the door proper, as clearly shown in Figs. 1, 3 and 5. Extending outwardly from the grooves 11 to the outside face of the door member are slots 18, which slots have preferably a metallic liner 19 of a size sufficient to permit the shank 20 of a screw member 21 to slide freely. The screw member 21 has its end threaded into a boss 22 fast on the slide 14, as clearly shown in Fig. 5.

In the form of attachment shown in Figs. 8, 9 and 10, the screw member operates through a slot 24 in said member which member is adjustably attached to the faces of the door or window by means of screws 25 taking through slots 26 in the flange portion 27 of said members.

By this means the attachment 12 may be adjusted in position so as to hold the stop member 15 generally in the right position of adjustment relative to the surface to be contacted by it, the actual contact, however, being effected by pressure of springs 16. This is accomplished by first having the member 14 held in retracted position by screws 21, then closing the door or window, then releasing all of screws 21, whereupon the springs 16 will force the slides 14 outwardly and cause the contact pieces 15 to engage firmly and uniformly the threshold and jamb surfaces, after which the screws 21 are turned in so as to hold the parts 14 and the contact piece 15 carried thereby in a fixed position, where, by automatic accommodation, a complete and uniform contact is effected. With the parts in this position, the door or window may be swung back and forth and the contact pieces 15 will always just make the proper contact to provide effective sealing. If at any time the contact pieces should become so worn as to permit air to pass through, merely by loosening the screws 21 there will be further automatic accommodation to effect perfect sealing. In practice it is desirable for the householder employing this sealing means periodically to loosen the screws 21 and retighten them, which is all that is needed in order to effect automatic accommodation for perfect sealing contact.

As shown in Fig. 12, the above-indicated arrangement is applied directly to automobile doors. In this form, since there is always direct contact against an internal member, the sealing member 15, held at the end of the slide 14, is freely movable by means of spring 16 upon a screw 28 which is threaded into the frame or body of the door, and which operates through slots 29 in the slide 14 as shown in Figs. 4 and 12. In this form there is automatic accommodation and adjustment each time the door is closed. A similar arrangement is shown in Figs. 8 and 9, where a door, other than an automobile door, contacts directly with the stop member. In general, however, the automatic adjustment and the accommodation will be controlled by means of screw 21, so that after it has been effected through the operation of springs 16 the parts will be held in fixed relation and will retain that relation in use until wearing of the stop member calls for loosening of the screw to permit again automatic accommodation and adjustment.

The advantages of our invention have been clearly defined in the foregoing specification. It is evident that at all times an automatic accommodation will effect sealing contact all about the door, which contact will be automatically retained or restored at any time merely by loosening the screws 21 and resetting them. In addition to effecting a sealing of the door opening, the operation of our stop members, particularly as in automobile doors such as shown in Fig. 12, and where they furnish a contact against which the door is caused to move in closing, as in Figs. 8 and 9, there will be a rapid, soft checking of momentum of the door which prevents sounds of slamming, chattering or rattling, which is of the highest advantage in automobile doors where such chattering and rattling may continue after the closing of the door because of the movement and vibration of the door support.

We claim:

1. In combination with a closure, means forming a longitudinal slot at the edge thereof, a contact piece adapted for lateral adjustment in said slot, releasable and engageable adjusting members supported for in and out movement in a direction at right angles to the plane of said closure whereby said members may be operated when said closure is in closed condition, said members when in normal engaged position serving to hold said contact piece in rigidly fixed position and when in temporary released position releasing said contact piece from its rigidly fixed position, and resilient means which urge said contact piece into uniform sealing contact when said adjusting means are temporarily released with said closure in closed condition only.

2. In combination with a closure, means forming a longitudinal slot at the edge thereof, a slide adapted for lateral adjustment in said slot, a contact piece carried by said slide, releasable and engageable adjusting members supported for in and out movement in a direction at right angles to the plane of said closure whereby said members may be operated when said closure is in closed condition, said members when in normal engaged position serving to hold said slide in rigidly fixed position and when in temporary released position releasing said slide from its rigidly fixed position, and resilient means which urge said contact piece into uniform sealing contact when said adjusting members are temporarily released with said closure in closed condition only.

3. In combination with a closure, means forming a longitudinal slot at the edge thereof, a slide adapted for lateral adjustment in said slot, a contact piece carried by said slide, screws engaging said slide and supported for in and out movement in a direction at right angles to the plane of said closure whereby said screws may be turned when said closure is in closed condition, said screws when in normal position serving to hold said slide in rigidly fixed position and when in temporary position releasing said slide, and resilient means which urge said contact piece into uniform sealing contact when said screws are turned temporarily into releasing position with said closure in closed condition only.

4. In combination with a closure, a piece adjustably secured to a side of said closure adjacent an edge thereof and having a portion offset from the face of said closure to form a longitudinal slot opening towards its edge, a contact piece adapted for lateral adjustment in said slot, releasable and engageable adjusting members supported for in and out movement in a direction at right angles to the plane of said closure whereby said members may be operated when said closure is in closed condition, said members when in normal engaged position serving to hold said contact piece in rigidly fixed position and when in temporary released position releasing said contact piece from its rigidly fixed position, and resilient means which urge said contact piece into uniform sealing contact when said adjusting members are temporarily released with said closure in closed condition only.

5. In combination with a closure, means forming a longitudinal slot at the edge thereof, a contact piece adapted for lateral adjustment in said slot, releasable and engageable adjusting members, said members when in normal engaged position serving to hold said contact piece in rigidly fixed position and when in temporary released position releasing said contact piece from its rigidly fixed position, and resilient means which urge said contact piece into uniform sealing contact when said adjusting members are temporarily released with said closure in closed condition only.

FRANCIS E. HUFNAIL.
ALBERT C. HUFNAIL.